United States Patent Office 3,418,416
Patented Dec. 24, 1968

3,418,416
THERAPEUTIC COMPOSITION CONTAINING A NEW PYRIDOXINE DERIVATIVE
Jean Pierre Fourneau, Paris, France, assignor to Laboratoires Houde, Paris, France, a corporation of France
No Drawing. Filed Dec. 27, 1966, Ser. No. 604,633
Claims priority, application France, Jan. 3, 1966, 44,607; Dec. 13, 1966, 87,172
11 Claims. (Cl. 424—263)

ABSTRACT OF THE DISCLOSURE

Therapeutic composition containing, as active principle, a nucleophilic adduct of pyridoxine on the adehydic carbonyl grouping of glyoxylic acid, of empirical formula $C_{10}H_{13}NO_6$; the invention also comprises a process for the treatment of arterial and veinous circulatory disorders by means of said adduct.

---

The present invention relates to a therapeutic composition for the treatment, in particular, of arterial and veinous circulatory disorders, comprising, as active principle, a nucleophilic adduct of pyridoxine on the aldehydic carbonyl grouping of glyoxylic acid, of empirical formula $C_{10}H_{13}NO_6$, and a pharmaceutically acceptable vehicle.

The pyridoxine derivative of formula $C_{10}H_{13}NO_6$ is a new chemical compound of molecular weight 243.2 which is soluble at 20° C. in a ratio of about 1 part in about 10 parts of water; the pH of the saturated aqueous solution is about 4. It is very poorly soluble in cold absolute ethanol, poorly soluble in glacial acetic acid, insoluble in ether and chloroform. It exhibts the characteristic reactions of glyoxylic acid and those of pyridoxine. Its ultra-violet absorption spectrum is practically identical with that of pyridoxine (2 maxima at 355 and 255 m$\mu$).

The studies effected by the applicant to determine with accuracy the structure of the new derivative have shown that it is not a true salt, but rather a nucleophilic adduct of pyridoxine on the aldehydic carbonyl grouping of the glyoxylic acid, the —CHOH—COOH radical being attached to the pyridoxine molecule under the form

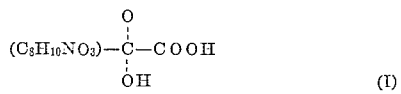

or under the form

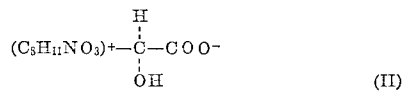

This is confirmed:

(a) By the empirical formula $C_{10}H_{13}NO_6$ confirmed by elemental analyses and also by the functional analyses effected, and also by the fact that there are no known anhydrous glyoxylic acid HCO—COOH salts: all the metal or organic base salts of this acid are salts of the hydrate form $(HO)_2CH-COOH$. Therefore, the true salt of glyoxylic acid (hydrate form) should have as empirical formula $C_{10}H_{15}NO_7$ and not $C_{10}H_{13}NO_6$ as in the present case;

(b) By the spectrographic study: the infrared absorption spectrum in KBr or Nujol shows no absorption in the region 1680–1800 cm.$^{-1}$, which proves there is no free aldehydic carbonyl grouping;

(c) By the nuclear magnetic resonance spectrum in deuteriated dimethylsulfoxide (DMSO—$d_6$) at room temperature, which shows the absence, in the weak fields, of any peak corresponding to an aldehydic proton.

It is apparent from the tests described above and others, that the derivative according to the invention is very likely to have one of the following formulae:

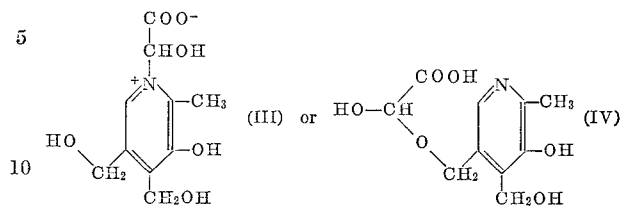

and probably Formula IV which corresponds to (3-hydroxy-4-hydroxymethyl-2-methyl-5-pyridyl) - 2 - methoxyglycolic acid.

Reference will be made below to the pyridoxine derivative as "pyridoxinyl-glyoxylate."

The structure of Formula IV above should make it possible, in particular, to explain the results of two biological tests described below, in which the effects of pyridoxine are reversed by its combination with glyoxylic acid (action on respiration of tissue homogenates and action on the central temperature of animals suffering from cyanide poisoning), either by blocking the pyridoxal phosphorylation, either by a competitive action of pyridoxal-phosphate enzymes under the action of pyridoxinyl-glyoxylate. Indeed, true vitamin $B_6$, co-factor of decarboxylases, transaminases, etc., is pyridoxal-phosphate (codecarboxylase)

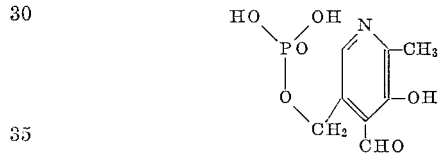

where the phosphorylated group is present in the same postion as the —CHOH—COOH group in pyridoxinylglyoxylate.

The pyridoxine derivative may be prepared by reacting substantially stoichiometrically equivalent amounts of glyoxylic acid (preferably in monohydrate form) and of pyridoxine in a hydroxylic solvent such as ethanol, for example.

The following detailed example embodying the process according to the invention is set forth by way of illustration and should not be considered limitative.

Example

While making lukewarm, 169 g. (1 mole) of pyridoxine base are dissolved in 2 l. of ethanol. To the solution are added 92 g. (1 mole) of crystalline glyoxylic acid monohydrate, previously dried in a vacuum exsiccator, and dissolved in the minimum amount of ethanol (about 130 ml). After ascertaining that the pH is close to 4, Norite is added to the solution which is then rapidly filtered. Crystallization is promoted and is then allowed to proceed during several days away from light and at room temperature. After suction filtering, the material is washed with ether and dried. There are thus obtained about 190 g. yield: 70%) of the desired pyridoxine derivative, in the form of a white crystalline powder melting (capillary) at 155° C. with decomposition.

*Analysis.*—Found: C, 49.42%; H, 5.56%; N, 5.84%. Calculated for $C_{10}H_{13}NO_6$: C, 49.38%; H, 5.39%; N, 5.76%.

Pyridoxinyl-glyoxylate has the useful property of being more stable than pyridoxine hydrochloride in neutral aqueous solution; indeed, the absorptions at 355 and 255 m$\mu$ of a neutral pyridoxine hydrochloride solution (at 10 $\mu$g./ml. in a phosphate buffer solution of pH 7) decrease very rapidly from the 46th day of storage down to 0 toward the 55th day, while the absorptions at the same wavelength of a pyridoxinyl-glyoxylate solution prepared in an identical manner decrease only very gradually, being still equal to 75% of their original values at about the 70th day of storage.

Glyoxylic acid and pyridoxine are well known materials occurring in all living matter, both being control agents in the basic metabolisms.

Pyridoxinyl-glyoxylate exhibits useful pharmacological properties different from those of both constituents thereof, as will become apparent to those skilled in the art on inspection of the data from toxicological and pharmacological tests set forth below for illustrative purposes only.

I.—Toxicology (1) Acute toxicity.—The $LD_{50}$ of pyridoxinyl-glyoxylate is of the order of 500 mg./kg. by the intravenous route, in mice. Orally, in rat, it is 3350 mg./kg. The toxicity of pyridoxine is practically nil; its $LD_{50}$ is of the order of 5500 mg./kg. by the oral route, in rat.

(2) Chronic toxicity.—On oral administration, during 7 weeks, to two batches of 18 rats, of dosages of 33.3 mg./kg. and 83.3 mg./kg., respectively, and also to two rabbits at the dosage of 50 mg./kg. daily: pyridoxinyl-glyoxylate has promoted the weight increase of the animals as compared with the reference animals (especially at the lower dosage in rat) and the pathological examination has shown no alteration attributable to toxic effects.

II.—Gastric tolerance

Pyridoxinyl-glyoxylate and pyridoxine hydrochloride were administered orally during 5 days to two batches of rats, at equimolecular dosages of 500 and 423 mg./kg., respectively. On completion of this treatment, the animals were sacrificed and the gastic mucosa was examined: in the batch treated with pyridoxinyl-glyoxylate a slight surface desquamation was noted in 3 cases out of 5, and in the batch treated with pyridoxine hydrochloride, a surface desquamation of the mucosa accompanied by some deeper lesions was noted. Thus, tolerance of pyridoxinyl-glyoxylate by the gastric mucosa appears to be better than that of the hydrochloride.

III.—Pharmacodynamic properties (1) Systemic effects.—Dosages of up to 50 mg./kg. i.v. have very little effect on blood-pressure, and a moderate respiratory analeptic effect (rat, guinea pig, rabbit, anesthetized or waking).

(2) Effect on the respiration of tissue homogenates.—Pyridoxinyl-glyoxylate depresses cellular respiration, which extends considerably the active life of the cells; in a typical experiment, the oxygen consumption, per time unit, measured with Warburg's apparatus, of an untreated rat liver homogenate is constant during the first two hours of incubation (total consumption during these two hours: 0.49 ml. $O_2$/g. homogenate), however, afterwards, it decreases strongly and rapidly.

The same homogenate with pyridoxinyl-glyoxylate added at the concentration of M/4000 consumes only 0.15 ml. $O_2$/g. during the first two hours (a decrease of 69.4% with respect to the reference), however, oxygen consumption, per time unit, is then maintained at the same rate during several hours. Therefore, this results in a true saving of oxygen by the cells, under the influence of pyridoxinyl-glyoxylate.

Moreover, the homogenate incubated in the presence of pyridoxinyl-glyoxylate has a colour which is more red than that of the reference, from which it may be concluded that there is an oxygenating effect at the level of the heminic compounds.

In a comparative test effected under the same conditions as the preceding test, the average decrease values of oxygen consumptions during the first 90 minutes of incubation, with respect to the reference homogenate, are as follows:

| | Percent |
|---|---|
| In the presence of pyridoxine hydrochloride | 31.3 |
| In the presence of potassium glyoxylate | 83.3 |
| In the presence of pyridoxinyl-glyoxylate | 70.1 |

It may be seen that the depressing action of pyridoxinyl-glyoxylate on cellular respiration is somewhat inferior to that of potassium glyoxylate; therefore, the effect of pyridoxinyl-glyoxylate is different from the added effects of both its constituents: glyoxylic acid and pyridoxine; indeed, such addition would result in a still higher depressant action than that of potassium glyoxylate (i.e., higher than 83.3%) and not in a lower action (70.1%).

The depressant action of pyridoxinyl-glyoxylate is highly advantageous since it maintains cell respiration at the same rate during extended periods of time whereas, in the absence thereof, respiration decreases gradually down to the point where it ceases almost completely.

(3) Effect on the central temperature of cyanide poisoned animals.—In a first test, sub-cutaneous administration of potassium cyanide, at a dosage of 8.5 mg./kg., to batches of 4 rats kept fasting for the past 20 hours and maintained at the ambient temperature of 23° C., causes an average decrease of 4° C. in the central temperature, expressing a metabolic depression due to the toxic effects of the cyanide on cellular oxidations. When 40 mg./kg. of glyoxylic acid are injected intra-peritoneally 5 min. before the cyanide injection, the average decrease of the central temperature is only of 2.6° C. Pyridoxinyl-glyoxylate, at the equimolecular (105.5 mg./kg.) dosage exerts a still more powerful protective effect; the temperature decrease is only 1.8°.

In three other tests effected under the same conditions with batches of 8 rats (from another source than those of test No. 1), the average cyanide-induced maximum temperature decreases were the following, after administration of glyoxylic acid and of pyridoxinyl-glyoxylate at the same dose levels as in test No. 1, and of pyridoxine hydrochloride at the equimolar dosage of 89 mg./kg.:

| Test No | 1 | 2 | 3 | 4 |
|---|---|---|---|---|
| CNK (s.c.), mg./kg | 8.5 | 8.5 | 8.5 | 9 |
| Controls,° C | 4 | 2.2 | 1.9 | 2.8 |
| Pyridoxine hydrochloride,° C | | 3.3 | 2.7 | 3 |
| Glyoxylic acid,° C | 2.6 | 2 | 1.5 | 2.4 |
| Pyridoxinyl-glyoxylate,° C | 1.8 | 2.2 | 1.8 | 2.1 |

The values are less significant in tests No. 2, 3 and 4 than in test No. 1 due to the low temperature decrease produced by the cyanide, but it is very markedly apparent that pyridoxine hydrochloride enhances the effects of cyanide, the temperature decrease being always more severe in the rats treated with pyridoxine hydrochloride (tests No. 2, 3 and 4), while it is constantly less in the animals treated either with glyoxylic acid or with pyridoxinyl-glyoxylate. In both the most significant tests (No. 1 and 4), this temperature decrease is even less marked following administration of pyridoxinyl-glyoxylate than after administration of glyoxylic acid. It should be noted, moreover, that the systemic condition of the animals, after the cyanide injection, is very poor in the control animals and in the rats treated with pyridoxine hydrochloride, while those treated with glyoxylic acid or with pyridoxinyl-glyoxylate have a substantially normal behavior.

Thus, the effect of pyridoxinyl-glyoxylate differs widely from the added effects of both its constituents; indeed, in the present case, such addition would result in an absence of protection, or even in an increase of the cyanide-induced anoxia, whereas the protective effect of pyridoxinyl-glyoxylate is at least equal, if not superior, to that produced by glyoxylic acid. It is likely that this protective effect is due to the oxygen savings effected by the tissues and made apparent by the preceding in vitro tests.

(4) Effect on oxygen partial pressure in arterial and veinous blood. — Oxygen partial pressure ($pO_2$) was measured simultaneously in the arterial blood and in the veinous blood of rabbit by the polarographic method of B. Rybak (Life Sciences, 1964, 3, 725). The intravenous injection of 5–25 mg./kg. of pyridoxinyl-glyoxylate increases the ventilation rhythm and amplitude by about 20% during 30–90 seconds. During this time, following a slight transient decrease, the arterial and veinous $pO_2$ increase by 12 to 15%, however, the arterial $pO_2$ returns to its original value at the same time the ventilation returns to normal, while the veinous $pO_2$ is maintained at a higher level than the original level during 6–7 minutes, expressing a decrease of oxygen consumption. Thus, not only does pyridoxinyl-glyoxylate promote systemic oxygenation by its stimulating action on ventilation, but also it reduces its oxygen requirements. As in the above in vitro experiments on tissue homogenates, it effects, in the entire living animal, a true saving in oxygen.

(5) Protective effects of pyridoxinyl-glyoxylate against anoxia.—The protective effects of pyridoxinyl-glyoxylate against anoxia were evidenced (1) on the isolated auricle of guinea pig, and (2) on the whole animal (mouse) submitted to three different anoxia tests.

(1) Isolated auricle of guinea pig

The isolated auricle of guinea pig is normally supplied with carbogen-aerated tyrode (95% $O_2$ and 5% $CO_2$). When carbogen is substituted with a 95% $N_2$-5% $CO_2$ mixture, the spontaneous contractions of the auricle disappear entirely within 1 or 2 min., but reappear, even after an anoxia of long duration, when oxygen is restored.

The pyridoxinyl-glyoxylate, introduced in the jar during the recovery stage, facilitates the resumption of the contractions, which appears generally sooner, with an usually greater amplitude. Optimum dosage is of the order of 50 μg.

The time required after the anoxia stage for the beats to recover an amplitude one-half that of the starting amplitude is measured.

8 min. anoxia:          Measured average times, s.
     Control animals (6 anoxiae) _____ 214
     Pyridoxinyl-glyoxylate (4 anoxiae) (50 μg.) __ 140

(2) Anoxia tests in mice (A) Decompression.—The mice are introduced one by one in a desiccator wherein vacuum is obtained with a reproducible rate, reaching 45 cm. Hg within 30 s. and a maximum of 64 cm. Various symptoms are noted, including particularly ataxia and highly rapid circular motions, and then clonic spasms, sometimes tonic spasms, immediately followed by death.

Pyridoxinyl-glyoxylate was administered 20 mn prior to introduction of the mice in the desiccator, at the dosage of 100 mg./kg. intraperitoneally (i.p.).

The following results were obtained:

| | Average time before appearance of the spasms, seconds | Average time prior to death, seconds |
|---|---|---|
| Control animals (11 mice) | 62.3 | 91 |
| Pyridoxinyl-glyoxylate: 100 mg./kg. i.p. (10 mice) | 78 | 107.8 + |

(B) Nitrogen-$CO_2$ gas mixture.—In this test, anoxia was produced using a gaseous mixture comprising 95% $N_2$ and 5% $CO_2$.

The mice are introduced one by one in a jar closed by means of a plug having 2 holes. The anoxia-producing gas is admitted into the constant pressure jar during a specific period of time which is constant for a given test (generally 30 s.), the outlet being controlled once and for all so that there is no over-pressure within the jar.

Under such conditions, the following symptoms are noted within the first seconds of the introduction of the gaseous mixture: respiratory difficulty, agitation, motor incoordination, followed by clonic spasms, sometimes tonic spasms, and death.

Pyridoxinyl-glyoxylate was administered 20 mn prior to the introduction of the mice in the jar, at the dosage of 100 mg./kg. i.p. The following results were obtained:

Average time prior to death, s.
Control animals _____ 85
Pyridoxinyl-glyoxylate, 100 mg./kg. i.p. _____ 99

(C) Nitrogen-oxygen mixture with low oxygen content (1st test—single intraperitoneal administration).—In these tests, anoxia was produced using a gaseous mixture comprised of 96% $N_2$ and 4% $O_2$. Pyridoxinyl-glyoxylate was administered to homogeneous batches of 6 mice. 2 treated mice and 1 control mouse are submitted simultaneously to the anoxia.

| | Average time prior to death, seconds | Extension of survival time (percent/control animals) |
|---|---|---|
| Control animals (12 mice) | 279 | |
| Pyridoxinyl-glyoxylate: | | |
| 100 mg./kg. i.p | 322.6 | 15.65 |
| 250 mg./kg. i.p | 369.3 | 32.4 |

2nd test (previous oral chronic administration).—3 batches of 8 mice were treated with, respectively:

Physiological saline solution, 0.10 ml./20 g., orally, daily
Glyoxylic acid monohydrate, 40 mg./kg. orally, daily
Pyridoxinyl-glyoxylate, 100 mg./kg., orally, daily (during 5 days)

and were submitted to the anoxia test 3 hours after the last administration.

Average time prior to death, s.
Control animals _____ 219.9
Glyoxylic acid monohydrate, 40 mg./kg. _____ 287
Pyridoxinyl-glyoxylate, 100 mg./kg. _____ 328

It may be seen that the mice resist much longer to oxygen deprivation when they have been treated previously, during 5 days, with a daily oral dose of pyridoxinyl-glyoxylate.

In this test which, furthermore, is quite close to actual clinical conditions, pyridoxinyl-glyoxylate is more active than glyoxylic acid.

To summarize, pyridoxinyl-glyoxylate accelerates and reinforces the recovery of the isolated auricle when oxygen is restored to it after an anoxia stage, and delays the appearance of spasms and death in mice placed in the atmosphere having a reduced oxygen content by three different methods: decompression, inhalation of a nitrogen-$CO_2$ gas mixture or of a nitrogen-4% oxygen mixture. This protective effect against anoxia is still more marked after daily oral administration during several consecutive days.

The above results show, in particular, that pyridoxinyl-glyoxylate exhibits marked advantages over pyridoxine hydrochloride:

(a) Its neutral aqueous solutions are more stable and it is better tolerated by the gastric mucosa;

(b) The aggravating effects of pyridoxine on cyanide-induced anoxia are completely neutralized, if not inverted, in the case of pyridoxinyl-glyoxylate. The same holds true with respect to the inhibiting action of pyridoxine on the respiration of tissue homogenates which is not added to the reversible depressant action of glyoxylic acid: quite on the contrary, the effect of pyridoxinyl-glyoxylate is somewhat less marked than that of glyoxylic acid;

(c) Finally, glyoxylic acid being a part of the glyoxylate molecule according to the invention adds its own therapeutic properties to those of pyridoxine, whereby the cells become capable of saving oxygen and of slowing down their metabolic activity and may thus reconstitute their energizing stores, while pyridoxinyl-glyoxylate has a stimulating action on pulmonary ventilation which increases the oxygen supply to the tissues.

The composition according to the invention is advantageously formulated in dosage units—for parenteral, oral or rectal administration, containing: for parenteral administration, from 50 to 150 mg. of active principle; for oral administration, from 50 to 300 mg. of active principle, and for rectal administration, from 100 to 300 mg. of active principle, respectively.

In such dosage units, the active principle is combined with the usual vehicles or excipients suitable for the administration.

Below are given three nonlimiting examples of pharmaceutical forms of the therapeutic composition:

(1) Capsules:
   Pyridoxinyl-glyoxylate _____ mg__ 100
   Excipient: lactose and talc, q.s. for 1 finished capsule.
(2) Injectable solute:
   Pyridoxinyl-glyoxylate _____ g__ 2
   Sodium chloride _____ g__ 0.42
   Water for injectable preparations,
     q.s. to make 100 ml.
   (filled into 3 ml. ampoules and sterilized in the autoclave)
(3) Suppositories:
   Pyridoxinyl-glyoxylate _____ mg__ 250
   Semi-synthetic glycerides, q.s. for a
     weight suppository (finished) _____ g__ 2

The invention relates also to a process for the treatment of patients suffering from arterial or veinous circulatory disorders comprising administering to said patients from 50 to 600 mg. per 24 hours of the previously defined pyridoxine derivative.

Administration is advantageously effected by means of the composition according to the invention: by the parenteral (intravenous or intramuscular) route at a dosage of about 50–200 mg. of active principle per 24 hours; by the oral route, at a dosage of about 100–600 mg. and by the rectal route, at a dosage of about 100–600 mg.

The clinical experimentation of pyridoxinyl-glyoxylate was made on scores of patients—both male and female—suffering from cardio-vascular diseases in six different hospital centres. Agreeing results were obtained. The therapeutic efficacy was found to be excellent (marked improvement of functional and clinical signs in most cases), so was the tolerance. The product is particularly active in the treatment of arteriopathy of the lower limbs, of coronary diseases and of trophic disorders due to veinous insufficiency, of cerebral circulatory disorders, and the like.

Since no increase in the flow rate of the blood was noted, it is likely that the drug is effective through a metabolic mechanism rather than through a vasomotor mechanism.

The results of experiments effected via the veinous route show that the drug is capable of causing an increased oxygen consumption by the diseased tissues.

There will be given now, for illustrative purposes, some results of clinical experiments effected with the drug according to the invention.

Pyridoxinyl-glyoxylate was administered orally, in the form of capsules containing 100 mg. active principle, with favourable results in practically all cases. For illustrative purposes, there are set forth below six detailed case reports concerning one coronary insufficiency and one angor, three cases of arteriopathy of the lower limbs (one with hyperlipemia), and one veinous insufficiency of the lower limbs.

Case Report No. 1

Mr. Pla . . ., Louis, 76 years old (1.73 m.–80 kg.) suffers from coronary insufficiency. Precordial discomfort on strain for the past five years. The strain appears especially during the digestive period. Slight cardiac souffle.

The patient was submitted to a treatment based on two, then three capsules (containing 100 mg. active principle each) daily.

Results.—The patient has followed his treatment with regularity; he still feels some precordial discomfort, however, less frequently and with less intensity.

The drug was satisfactorily tolerated. Good results from a functional standpoint, the electric recording remains unchanged. The patient was advised to take the drug in a continuous manner.

Case report No. 2

Mrs. Leb . . ., 62 years old (1.59 m., 64 kg.) suffers from arteriopathy of the lower limbs+hyperlipemia.

Artificial climacteric at the age of 43. Post-climacteric polyarthrosis.

Under regular medical supervision for many years due to an important, hyperlipemia which could be stabilized under the effect of adequate treatment.

For the past 5 years, onset of pains in both calves appearing after 200–300 metres normal walking, and after 100–200 metres fast walking. The pains cease as soon as the patient stops, and start anew when the walk is resumed.

Arteriography shows a diffuse atheroma especially marked at the level of the a. femoralis, particularly on the left side. No thrombosis.

The patient is treated with the drug of the invention, at the dosage of 2–3 capsules (containing 100 mg. of active principle each) daily.

Results.—Increase of the walking perimeter: 500 m. for fast walking, and 1 km. for normal walking. Although some trifling pains appear, they do not force the patient to stop completely.

Perfect tolerance. No change from the clinical and electric standpoints.

Case Report No. 3

Miss . . ., Ginette, 37 years old (172 m., 64 kg.), suffers from veinous insufficiency of the lower limbs. Functional signs appearing when walking, but especially at rest. Heavy feeling in the legs, fatigue appears rapidly. Moreover rapid swelling of the legs occurs on slight fatigue.

Clinical examination.—Cold legs. Oscillations within the normal range. Taut appearance of the veins, locally.

Normal blood pressure: 13–8 in recumbent position and in standing position.

The electrocardiographic inspections have always shown strictly normal recordings.

Treatment.—The patient is administered the drug of the invention at the rate of 2–3 capsules (each containing 100 mg. of active principle) daily for a period of one month, and then 1 per day during the following month.

Results.—The patient declares that she feels almost no pain and that there is no more swelling of the legs. Tolerance was perfect. Therefore, the patient was advised to follow a continuous treatment, at the rate of 2 capsules daily.

Case Report No. 4

Mr. Gui . . ., 59 years old (1.69 m., 66 kg.), suffering from arteriopathy of the lower limbs.

Functional signs.—Walking perimeter: 500 m. for a normal walk. May run for a distance of over 100 m. without cramps. In contrast, on fast walking, must stop after 200 m., pain appearing in the right calf.

Physical signs.—The local temperature of both lower limbs is within the normal range; the oscillations are 3½ at the lower third of the left leg, and 1¼ on the right side. No trophic disorders.

Treatment.—The patient is given the drug of the invention at a rate of 2 capsules (containing 100 mg. of active principle) daily during the first week, and of 3 capsules (containing 100 mg. of active principle) daily during the next three weeks.

Results.—Is able after 1 month of treatment to walk a distance of up to 2 kilometers without fatigue, nor pain. Rapid walking is improved and may reach up to 300–350 m. The oscillations are 4 on the left leg and 2½ on the right leg.

Thus, the drug has produced a marked improvement of the functional signs, even the oscillations have increased. Tolerance is perfect, and Mr. G. . . pursues his treatment continuously.

Case Report No. 5

Miss Tro . . ., Eugenie, 58 years old (1.63 m., 69 kg.), suffers from angor.

Functional signs.—Appearance of anginose pains, on strain, for the past 2 years. The patient works in the capacity of governess and is therefore mostly indoors. Is rapidly out of breath on the slightest strain caused by daily routine work. When out in the street, has to stop after 100 m.

Radioscopic examination shows a broadened unwound aorta.

Treatment.—2 capsules (containing 100 mg. of active principle each) daily, during a period of time of two months.

Results.—From a functional standpoint, the patient is much less out of breath, and feels tired only in the evening and after a hard day's work. Tolerance was excellent. Good functional results.

Case Report No. 6

Miss Sel . . ., France, 67 years old (1.51 m., 39 kg.), suffers from arteriopathy of the lower limbs.

Functional signs.—The walking perimeter reaches only 20 m. and the patient has to stop due to pains in the calves and shortness of breath.

Physical signs.—Cold hands and feet.

Clinical examination.—Blood pressure 17/9. Oscillations: ¾ on the left side, 0 on the right (lower third of the leg).

The electrocardiogram shows abnormal repolarization at rest and after strain.

Treatment.—1 to 2 capsules (containing 100 mg. of active principle each) daily+reflexogenic massage.

After one month of treatment, the patient is now able to cover a distance of 300–500 metres, without fatigue, on uneven ground; there is even no shortness of breath any longer. Blood pressure is 16/9. Oscillations are ½ on the left side and 1 on the right side. Unchanged electrocardiogram.

Conclusion.—Good tolerance. Excellent functional results. Improved oscillations.

Having now described my invention what I claim as new and desire to secure by Letters Patent is:

1. Therapeutic composition for the treatment of arterial and venous circulatory disorders, in dosage form, each dosage unit comprising from 50 to 300 mg., as active ingredient, of a nucleophilic adduct of pyridoxine on the aldehydic carbonyl grouping of glyoxylic acid, of empirical formula $C_{10}H_{13}NO_6$, a solid melting at 155° C. (capillary, with decomposition), soluble at 20° C. in water in a ratio of about 1 part in about 10 parts of water, the pH of the saturated aqueous solution being about 4, very poorly soluble in cold absolute ethanol, poorly soluble in glacial acetic acid, insoluble in ether and chloroform, showing 2 maxima at 355 and 255 m$\mu$ in its ultraviolet absorption spectrum (c.=10$\mu$g./ml. in a phosphate buffer solution of pH 7) and exhibiting the characteristic reactions of glyoxylic acid and pyridoxine; and a pharmaceutically acceptable vehicle.

2. Composition as claimed in claim 1, in dosage units for parenteral administration, containing each 50–150 mg. of active principle.

3. Composition as claimed in claim 2, in the form of an injectable solute.

4. Composition as claimed in claim 1, in dosage units for oral administration containing each 100–300 mg. of active principle.

5. Composition as claimed in claim 4 in the form of capsules.

6. Composition as claimed in claim 1, in dosage units for rectal administration containing each 100–300 mg. of active principle.

7. Composition as claimed in claim 6, in the form of suppositories.

8. Process for the treatment of patients suffering from arterial and venous circulatory disorders, comprising administering to said patients from 50 to 600 mg. per 24 hours of a nucleophilic adduct of pyridoxine on the aldehydic carbonyl grouping of glyoxylic acid, of empirical formula $C_{10}H_{13}NO_6$, a solid melting at 155° C. (capillary, with decomposition), soluble at 20° C. in water in a ratio of about 1 part in about 10 parts of water, the pH of the saturated aqueous solution being about 4, very poorly soluble in cold absolute ethanol, poorly soluble in glacial acetic acid, insoluble in ether and chloroform, showing 2 maxima at 355 and 255 m$\mu$ in its ultra-violet absorption spectrum (c.=10 $\mu$g./ml. in a phosphate buffer solution of pH 7) and exhibiting the characteristic reactions of glyoxylic acid and pyridoxine.

9. Process as claimed in claim 8, wherein there are administered by the parenteral route 50–200 mg. of said adduct per 24 hours.

10. Process as claimed in claim 8, wherein there are administered by the oral route 100–600 mg. of said adduct per 24 hours.

11. Process as claimed in claim 8, wherein there are administered by the rectal route 100–600 mg. of said adduct per 24 hours.

No references cited.

RICHARD L. HUFF, *Primary Examiner.*

U.S. Cl. X.R.

260—295.5; 424—317